United States Patent

[11] 3,539,227

[72] Inventors Gilbert Henry Drutchas;
Hubert M. Clark, Birmingham, Michigan;
Harold R. Scibbe, Chardon, Ohio
[21] Appl. No. 774,143
[22] Filed Nov. 7, 1968
[45] Patented Nov. 10, 1970
[73] Assignee TRW Inc.
Cleveland, Ohio
a corporation of Ohio

[54] HYDRAULIC POWER BRAKE SYSTEM WITH SKID CONTROL
14 Claims, 1 Drawing Fig.
[52] U.S. Cl. ................................................... 303/21,
303/6, 303/10, 303/24
[51] Int. Cl. ....................................................... B60t 8/06,
B60t 8/14
[50] Field of Search ............................................. 303/6, 10,
21, 24, 61—63, 68—69; 188/181

[56] References Cited
UNITED STATES PATENTS
| | | | |
|---|---|---|---|
| 3,014,764 | 12/1961 | Heckendorf............... | 303/21 |
| 3,124,220 | 3/1964 | Kell.............................. | 188/181 |

Primary Examiner—Duane A. Reger
Assistant Examiner—John J. McLaughlin, Jr.
Attorney—Hill, Sherman, Meroni, Gross and Simpson ABSTRACT: An antiskid control device having a fluid pump means driven by the vehicle drive shaft and having an inertial valve balanced against fluid pressure from said pump means to regulate the pressure of a fluid pressure signal delivered to a power brake unit. The inertial valve is aligned substantially parallel to the principal axis of the vehicle, and vehicle deceleration causes forward movement of a piston like valve head for closing off a bypass port, thereby increasing fluid pressure to the power brake unit. Decreases in pump speed and hence fluid pressure will result from the approaching wheel lock or skid conditions thereby decreasing fluid pressure to the power brake unit and releasing the brakes, thereby permitting a rotation of the wheel at high braking torque.

Patented Nov. 10, 1970
3,539,227
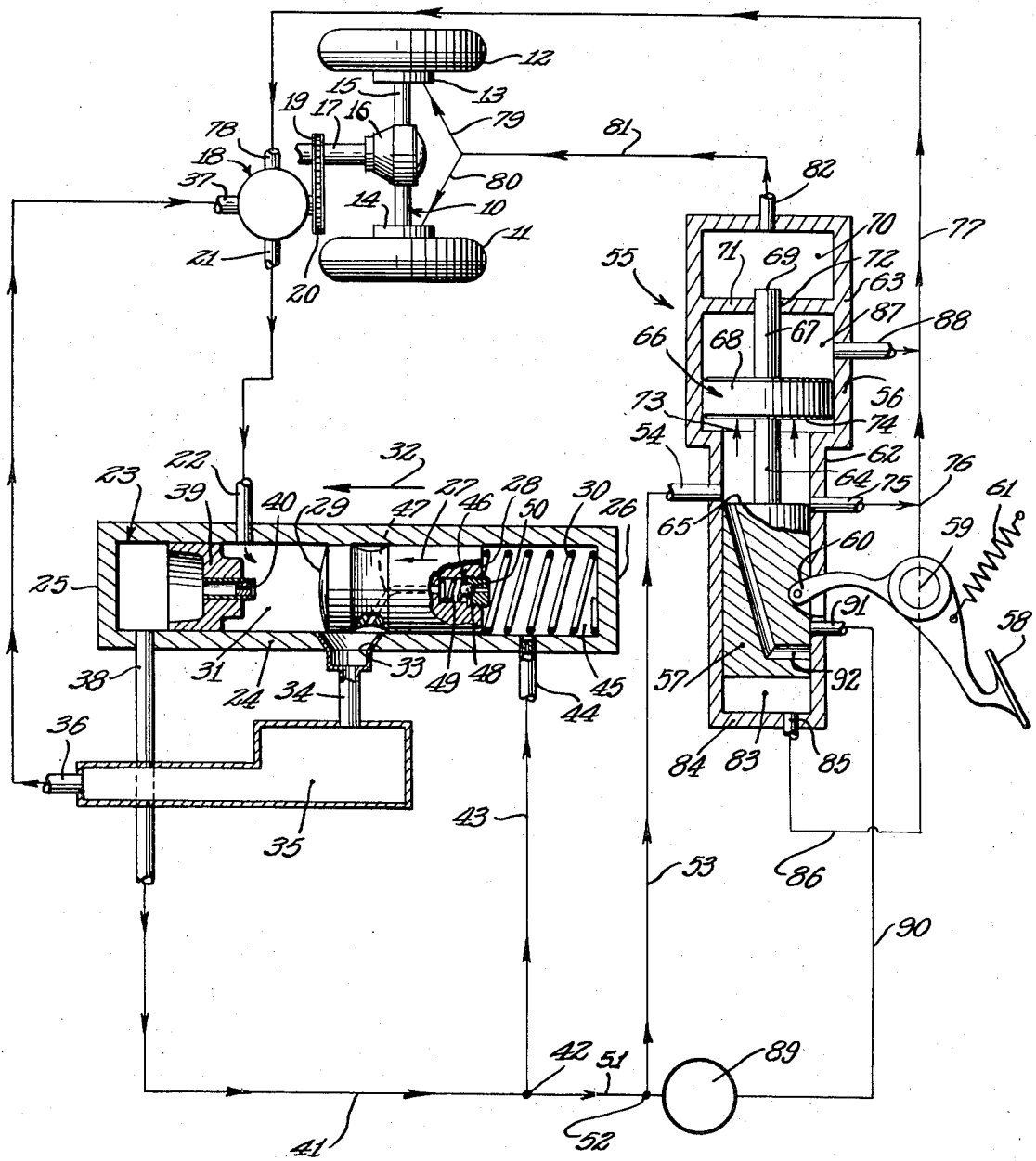
INVENTORS
Gilbert H. Drutchas
Hubert M. Clark
Harold R. Scibbe
BY Hill, Sherman, Meroni, Gross & Simpson
ATTORNEYS 3,539,227

HYDRAULIC POWER BRAKE SYSTEM WITH SKID CONTROL

BACKGROUND OF THE INVENTION

Field of the Invention

The field of art to which this invention pertains is an antiskid control device and in particular an antiskid control device utilizing hydraulic fluid pressure in conjunction with a power brake unit to control the braking force of a vehicle and to secure a controlled release of the vehicle brakes during wheel lock or skid conditions.

SUMMARY

It is an important feature of the present invention to provide a hydraulic antiskid sensor and control system.

It is also a feature of the present invention to provide a hydraulic skid control sensing device which is cooperatively associated with a power brake unit for regulating the braking force applied to vehicle wheels.

It is an important object of the present invention to provide an improved antiskid control device.

It is another object of this invention to provide an antiskid control device which is wholly operated by a hydraulic pressure signal.

It is a further object of this invention to provide an antiskid control device which utilizes an inertial valve to regulate fluid pressure delivered to a power brake unit.

It is another object of this invention to provide an antiskid brake device wherein rotational speed of vehicle wheels is sensed as hydraulic fluid pressure generated by a pump means and wherein linear vehicle deceleration is sensed by an inertial valve coacting with the fluid pressure for said pump means to regulate the pressure delivered therefrom to a power brake unit.

It is an additional object of this invention to provide an inertial valve for use with a hydraulic antiskid brake control device which includes a valve head slidable within a sensor housing which is orientated parallel to the principal axis of the vehicle and which utilizes the inertial motion of the valve head to open and close a bypass hydraulic fluid port to thereby regulate the fluid pressure delivered to a power brake unit.

It is also an object of this invention to provide an antiskid hydraulic control device in conjunction with a power brake unit wherein the rotary deceleration of the vehicle wheels are sensed by the rate of drop of fluid pressure from a pump means and wherein an inertial valve is utilized to sense the linear deceleration of the vehicle and to compare the linear deceleration with the rotary deceleration of the vehicle wheels to generate thereby a hydraulic pressure signal for use at a hydraulic power brake unit.

These and other objects, features and advantages of the present invention will be understood in greater detail from the following description and the associated drawing wherein reference numerals are utilized to designate a preferred embodiment.

BRIEF DESCRIPTION OF THE DRAWING

The single sheet of drawing of the present invention illustrates a hydraulic antiskid brake sensor and control device which compares rotary deceleration of the vehicle wheels with the linear deceleration of the vehicle to generate a hydraulic control signal which signal is communicated with an actuation surface of a power brake unit for increasing or decreasing the braking force on the wheels to eliminate wheel skid or wheel lock conditions and to maintain maximum braking efficiency.

DESCRIPTION OF THE PREFERRED EMBODIMENT

A vehicle in accordance with this invention is shown in the drawing and illustrated partially by the reference numeral 10. The vehicle includes a pair of rear wheels 11 and 12 and wheel brake motor means 13 and 14. The rear wheels 11 and 12 are driven through an axle 15 which in turn is driven through a differential 16 by means of a drive shaft 17. The drive shaft 17 is driven directly from the vehicle transmission as is well understood.

It is well understood in the art, that should the braking means 13 and 14 be applied rigidly such that the wheels 11 and 12 should lock thereby causing a skid condition, a loss in braking efficiency will result. In particular, a vehicle will require a longer braking distance under a wheel lock or skid condition than under a condition where the wheels are maintained in a controlled rolling condition at all times during which an impending skid but never an actual skid condition exists.

It is also well known in the prior art that the braking force delivered to the brake motor means 13 and 14 can be regulated by sensing means which compares the rotary deceleration of the vehicle wheels with the linear deceleration of the vehicle. Under a wheel lock or skid condition, the vehicle wheels 11 and 12 would decelerate rapidly and actually lock, while the vehicle deceleration would be at a minimum during the skid as compared to the deceleration which could be expected by maintaining the wheels 11 and 12 in a rolling condition during the braking effort.

If it is found that the rotary deceleration of the vehicle wheels significantly exceeds the linear deceleration of the vehicle itself, means can be provided for releasing the braking effort on the brake motor means 13 and 14. Once the linear deceleration of the vehicle increases to a desired proportion with respect to the deceleration of the vehicle wheels, the maximum braking effort can be restored and hence maximum braking efficiency can be continuously established for minimum braking or minimum stopping distance.

In the present invention, an entirely hydraulic control system is provided to eliminate skidding of the vehicle wheels 11 and 12.

In particular, in the present invention, two hydraulic circuits are provided. The first hydraulic circuit senses the rotary deceleration of the vehicle wheels and the linear deceleration of the vehicle and generates a signal in response thereto for controlling a power brake unit. The second hydraulic circuit is the hydraulic brake circuit which due to increases or decreases in fluid pressure therein applies or releases the brake motor means 13 and 14 to increase or decrease the braking effort on the vehicle.

Referring to the hydraulic sensing circuit, means are provided forming a closed loop which in automotive practice can be either an open center system or a closed center system. A pump means 18 is located at one point in the circuit and is coupled by means of a pinion 19 and mating gear 20. The drive shaft 17, then drives the pump 18 through the indicated gear ratio such that the pump generates a fluid pressure in a hydraulic circuit which is proportional to the rotational speed of the drive shaft 17 and hence of the vehicle wheels 11 and 12.

The pump 18 has an outlet 21 from which fluid at pump-generated pressure is directed to an orifice located downstream in the circuit. A bypass from a point in the circuit between the pump and the orifice leads to a point in the circuit on the inlet side of the pump and is controlled by a flow control valve means responsive to changes in the pressure drop across the orifice. The flow control valve means herein illustrated takes the form of a so-called inertial valve having an inlet 22 in an inertial valve housing 23. The inertial valve housing 23 has cylindrical side walls 24, and is closed at ends 25 and 26.

Essentially, the inertial valve is a linear deceleration sensor and includes a valve head or valve member 27 which is slidably mounted within the interior of the housing 23 as shown. The valve head 27 has a rear surface 28 and a forward surface 29 which are biased respectively by a coil spring 30 and by fluid pressure within a cavity 31 of the housing 23.

The forward vehicle direction is indicated by an arrow 32, and it is intended that the inertial valve housing 23 be orientated substantially parallel to the principal axis of the vehicle as indicated by the arrow 32. The inertial housing 23 is rigidly attached to the vehicle, and due to the orientation which is indicated by the arrow 32, rapid deceleration of the vehicle and hence of the housing 23 will cause a relative forward movement of the valve head 27. This forward movement which will be in the direction of the arrow 32 will be against the biasing force of fluid within the cavity 31.

The inertial valve is provided with a dump port 33 which is formed within the cylindrical housing wall 24 as shown. The dump port 33 extends through a conduit 34 to a dump 35 which in turn is coupled through a further conduit 36 back to an inlet 37 of the pump 18. Accordingly forward movement of the valve head 27 due to deceleration of the vehicle will cause the valve head to overlie the dump port 33 and tend to close off the dump port thereby increasing fluid pressure within the cavity 31. In this way, the forward and rearward movement of the valve head 27 in response to vehicle deceleration provides a means for sensing the linear deceleration of the vehicle and results in an increase in fluid pressure within the cavity 31 due to increases in vehicle deceleration. It will be understood that wheel deceleration will result in a decrease in fluid pressure within the cavity 31, and accordingly, wheel deceleration can be compared to vehicle deceleration with the result that a single pressure signal indicative of the comparison will be generated at an outlet 38 of the housing 23. It will be noted that a flow restrictive member 39 having an orifice 40 is provided within the housing 23 intermediate the inlet 22 and the outlet 38.

The outlet 38 is coupled as illustrated by the schematic coupling 41 to a fluid circuit junction point 42. A pressure sense means is formed in the circuit for acting on the flow control valve means. From the point 42, fluid is fed through a line 43 to an inlet 44 at the rear of the inertial housing 23. Fluid entering a cavity 45 formed between the housing wall 26 and the rear surface 28 of the valve head or piston 27 is passed by means of a pressure relief valve 46 through a port 47 to the dump port 33. As is well understood, the pressure relief valve consists of a ball 48 which is biased by means of a spring 49 into seated engagement at a valve seat 50.

Referring to the fluid circuit junction point 42, fluid is also fed through a line 51 to a further fluid circuit junction point 52. Fluid from the junction point 52 is then fed through a line 53 to an inlet 54 of a throttle valve means which in the form of the present disclosure also constitutes a power brake unit 55.

The power brake unit 55 as shown consists of a housing 56 which carries a slidable plunger 57 therein. The plunger 57 is moved within the housing 56 by means of operator actuating means comprising a manual brake pedal 58. The brake pedal 58 is pivoted at a point 59 and has an arm 60 coupled to the member 57 for actuating the same. A return spring 61 is provided for the brake pedal 58.

The housing 56 in the vicinity of the piston or plunger 57 consists of a radially reduced portion 62, while the remainder of the housing as at 63 consists of a radially enlarged portion. The plunger 57 has a piston rod 64 extending from a first surface 65 thereof to a further piston 66. The piston 66 is disposed in the radially enlarged portion 63 of the housing 55 and is the power brake piston. A smaller piston 67 extends from a surface 68 of the piston 66 and has a surface 69 which extends into a cavity 70 of the housing 55. The cavity 70 is formed by a partition 71 extending across the diameter of the radially enlarged portion 63. The partition 71 has a bore 72 through which extends the piston 67. Thus, the operator supplies operator-generated pressure to the brake motor means 13 and 14 as a component of braking fluid pressure by actuating the pedal 58.

Fluid pressure from the inlet 54 of the power brake unit is received within a cavity 73 and acts as pump-generated pressure against an actuation surface 74 of the piston 66. When the plunger 57 is in the position shown, fluid pressure from the cavity 73 extends through an outlet 75 to a circuit junction point 76 and hence through a fluid circuit line 77 to an inlet 78 of the pump means 18. Accordingly, so long as the plunger 57 remains in the position shown, fluid pressure will not increase within the cavity 73 to act on the actuation surface 74 of the piston 66.

However, when the pedal 58 is depressed, the plunger 57 is moved upwardly, thereby closing off the outlet 75 and allowing fluid pressure within the cavity 73 to increase, thereby acting on the actuation surface 74 and causing the piston and hence the piston face 69 to advance within their respective cavities to provide an additional component of braking fluid pressure.

The hydraulic circuit for the brake actuation motor means 13 and 14 is shown schematically by means of first and second hydraulic lines 79 and 80 which are coupled to a main hydraulic line 81. The hydraulic line 81 is fed from an outlet 82 of the cavity 70 as shown. Accordingly, as the piston face 69 advances within the cavity 70, hydraulic pressure within the line 81 and hence within the lines 79 and 80, increases, thereby increasing the braking force. In this way, depressing the pedal 58 results in an increase in the braking force on the brake motor means 13 and 14. It is noted that the rear cavity 83 formed between the plunger 57 and the rear wall 84 of the housing 55 is vented through an outlet 85 to a fluid circuit line 86 which couples to the circuit junction point 76 and hence through the line 77 to the fluid return 78 of the pump 18. In like manner, the cavity 87 formed between the surface 68 of the piston 66 and the partition 71, is vented through an outlet 88 to the fluid circuit line 77 and hence to the pump return 78.

In operation, should wheel skid occur, the pump 18 will be reduced to zero r.p.m., and fluid pressure in the line 22 will drop rapidly, thereby decreasing the fluid pressure within the cavity 73 of the power brake unit. Accordingly, the braking force on the rear wheels 11 and 12 will be decreased. Similarly, should the braking pressure applied to the rear wheels be at a minimum, allowing free rolling of the wheels 11 and 12, deceleration of the vehicle will cause the piston 47 to be advanced within the housing 23 and hence tends to close off the dump port 33, thereby allowing a rise in fluid pressure within the cavity 31 and hence at the outlet 38 which in turn feeds to the cavity 73 of the power brake unit thereby increasing fluid pressure in the hydraulic brake circuit. In this way, maximum braking efficiency can be achieved, and the braking effect can be continuously monitored to give the desired braking force at the brake motor means 13 and 14, irregardless of the braking effort applied to the brake pedal 58.

Should braking be desired when the vehicle is in a standstill condition, an accumulator 89 may be coupled to a fluid circuit point 52 and hence through a fluid circuit line 90 to an inlet 91 of the power brake unit 55. The plunger 57 is provided with a conduit 92 which may be aligned with the inlet 91 when the pedal 58 is depressed the required distance. When the conduit 92 is aligned with the inlet 91, fluid is allowed to flow therethrough into the cavity 73 for acting against the actuation surface 74 of the piston 66 thereby applying increased hydraulic pressure within the hydraulic braking lines due to an associated advancement of the pressurizing surface.

It will be understood that various modifications and combinations of the features described herein can be accomplished by those skilled in the art, but we desire to claim all such modifications and combinations as properly come within the scope and spirit of our invention.

We claim:
1. In a vehicle having wheels, a braking means associated with at least one of said wheels, and brake motor means for engaging and disengaging said braking means, an antiskid brake control system comprising:
   fluid pump means and a fluid circuit associated therewith including a fluid pressure source drivable by said pump through said fluid circuit;
   coupling means for driving said fluid pump at a speed proportional to the speed of said vehicle wheels;

orifice means through which fluid at pump-generated pressure is directed, bypass means ahead of said orifice and leading to the inlet side of said fluid pump means;

an inertial flow control valve including a housing and a valve head movable within said housing as a function of changes in the pressure drop across said orifice as well as in response to linear deceleration of said vehicle;

means for coupling fluid pressure from said fluid circuit into said housing at a point to oppose movement of said valve head in response to linear deceleration of said vehicle; and means responsive to the movement of said valve head to increase the fluid pressure within said fluid circuit, biasing means acting against said inertial flow control valve to oppose the increase of fluid pressure within said fluid circuit, and means for utilizing fluid pressure within said fluid circuit to actuate said brake motor means.

2. An antiskid brake control system in accordance with claim 1 wherein said housing comprises a closed cylinder rigidly attached to the vehicle and orientated substantially parallel to the principal vehicle axis and wherein said valve head includes a weighty pistonlike member slidably movable within said cylinder due to the deceleration of the vehicle.

3. In a vehicle having wheels, a braking means associated with at least one of said wheels, and brake motor means for engaging and disengaging said braking means, an antiskid brake control system comprising:

fluid pump means and a fluid circuit associated therewith including a fluid pressure source drivable by said pump through said fluid circuit;

coupling means for driving said fluid pump at a speed proportional to the speed of said vehicle wheels;

an inertial valve including a housing and a valve head movable within said housing in response to linear deceleration of said vehicle;

means for coupling fluid pressure from said fluid circuit into said housing at a point to oppose movement of said valve head in response to linear deceleration of said vehicle;

means responsive to the movement of said valve head to increase the fluid pressure within said fluid circuit, and means for utilizing fluid pressure within said fluid circuit to actuate said brake motor means;

said housing comprising a closed cylinder rigidly attached to the vehicle and orientated substantially parallel to the principal vehicle axis, said valve head including a weighty pistonlike member slidably movable within said cylinder due to the deceleration of the vehicle; and biasing means being provided to bias said weighty piston in the forward vehicle direction and wherein the normal position of said piston within said cylinder is intermediate said biasing means and the coupling point of said fluid pressure to said housing.

4. An antiskid brake control system in accordance with claim 3 wherein said means responsive to the movement of said valve head for increasing fluid pressure within said fluid circuit comprises a port formed within a wall of said housing, said piston being slidably engageable with said port to open and close the same in response to movement of said piston due to deceleration of said vehicle, and said fluid pressure within said housing being coupled through said port to a relatively low-pressure source.

5. An antiskid brake control system in accordance with claim 4 wherein said means for utilizing said fluid pressure to actuate said brake motor means comprises a power brake unit, a separate hydraulic circuit coupling said power brake unit to said brake motor means, and means for selectively coupling said fluid circuit to said power brake unit for actuating the same.

6. An antiskid brake control system in accordance with claim 5 wherein an accumulator is provided in said fluid circuit and wherein means are provided to selectively couple the accumulator to said power brake unit for actuating the same during stationary vehicle braking.

7. In a vehicle having wheels, a braking means associated with at least one of said wheels, and brake motor means for engaging and disengaging said braking means, an antiskid brake control system comprising:

fluid pump means and a fluid circuit associated therewith including a fluid pressure source drivable by said pump through said fluid circuit;

coupling means for driving said fluid pump at a speed proportional to the speed of said vehicle wheels;

an inertial valve including a housing rigidly secured to said vehicle and a weighty piston slidably movable in said housing in response to vehicle deceleration;

said housing being orientated substantially parallel to the normal vehicle axis;

said housing having an inlet receiving fluid at pump-generated pressure, an outlet and a dump port; said inlet and outlet being located at the forward vehicle side of said piston;

said dump port being located adjacent the forward vehicle facing portion of said piston and coupling the interior of said housing to the inlet side of said fluid pump means;

biasing means urging said piston in a forward vehicle direction;

said fluid pressure at said inlet urging said piston in a rearward vehicle direction;

said piston being engageable with said dump port for opening and closing the same;

a power brake unit;

a separate hydraulic braking circuit coupled from said power brake unit to said brake motor means; and means for coupling said outlet to said power brake unit for actuating the same.

8. An antiskid brake control system in accordance with claim 7 wherein a flow restrictive member is provided in said housing intermediate said inlet and said outlet.

9. An antiskid brake control system in accordance with claim 8 wherein said outlet is coupled to the rearward vehicle side of said piston and wherein a pressure relief valve is provided within said piston and said pressure relief valve couples fluid at the rearward side of said piston above a given pressure level to said dump port.

10. An antiskid brake control system in accordance with claim 9 wherein said power brake unit has an inlet and an outlet, and said outlet of said inertial valve is coupled to said power brake inlet, said fluid pump means being provided with a fluid return and said power brake outlet being coupled to said fluid return and wherein said power brake unit is provided with a manually actuable piston valve for opening and closing said power brake outlet thereby increasing the fluid pressure applied to said power brake unit from said power brake inlet.

11. For use in wheeled vehicles having an operator-actuated braking means, the improvement of a hydraulic skid control system comprising:

means forming a hydraulic circuit having a closed loop;

a pump at one point in said circuit having a driven connection with the wheels of the vehicle and operating to pressurize fluid in the circuit as a function of rotational vehicle wheel speed;

means forming an orifice in said circuit downstream of said pump and through which the pressurized fluid is directed, thereby to develop a pressure drop across said orifice;

means forming a bypass from a point in said circuit between said pump and said orifice to a point in said circuit on the inlet side of said pump;

flow control valve means in control of said bypass and having motive surfaces responsive to changes in the pressure drop across said orifice to regulate flow of fluid through said circuit by opening and closing the bypass;

hydraulic brake motor means responsive to braking fluid pressure to apply braking force to the wheels of the vehicle;

throttle valve means in said circuit between said orifice and the return side of said pump;

operator actuating means for supplying operator-generated pressure to said brake motor means as a component of said braking fluid pressure, said throttle valve means operable concurrently with said operator actuating means to direct fluid at pump-generated pressure from said circuit downstream of said orifice to said brake motor means as an additional component of braking fluid pressure and to recirculate fluid back to said one point in the circuit; and a pressure sense means in said circuit between said orifice and said throttle valve means acting on said flow control valve means, whereby operation of said throttle valve means will tend to increase the pressure in the circuit to increase the braking force on the wheels but reduction in the rotational speed of the wheels will cut down flow of fluid through the circuit and through the bypass.

12. The invention as defined in claim 11 and further characterized by said flow control valve means comprising inertial elements responsive to the rate of linear deceleration of the vehicle, thereby to close the bypass as a function of such linear deceleration.

13. An antiskid brake control system in accordance with claim 11 wherein said flow control valve means comprises an inertial valve, said inertial valve having a housing and a valve head movable in said housing in response to vehicle deceleration and means for applying fluid pressure from said fluid circuit to said housing at a point to oppose movement of said valve head due to vehicle deceleration.

14. An antiskid brake control system in accordance with claim 11 wherein said throttle valve means for utilizing said pump-generated fluid pressure to actuate said brake motor means comprises a power brake piston having an actuation surface and a pressurizing surface and means for selectively applying said fluid pressure to said actuation surface, said brake motor means being operated through a separate hydraulic circuit and said pressurizing surface extending within said separate hydraulic circuit and increasing the fluid pressure therein in response to the application of pressure to said actuation surface.